E. E. ORENDORFF.
Apple-Corers.

No. 198,954.   Patented Jan. 8, 1878.

Figure 1:
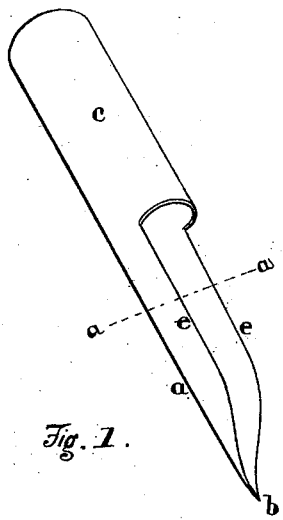

Cross sec. m aa fig. 1.

UNITED STATES PATENT OFFICE.

EMMA E. ORENDORFF, OF DELAVAN, ILLINOIS.

IMPROVEMENT IN APPLE-CORERS.

Specification forming part of Letters Patent No. 198,954, dated January 8, 1878; application filed July 3, 1877.

*To all whom it may concern:*

Be it known that I, EMMA E. ORENDORFF, of Delavan, in the county of Tazewell, in the State of Illinois, have invented an Improvement in Apple-Corers; and do hereby declare that the following is a full, clear, and exact description thereof, reference being had to the annexed drawings, making a part of this specification, in which like letters of reference refer to like parts, and in which—

Figure 2:
Figure 3:
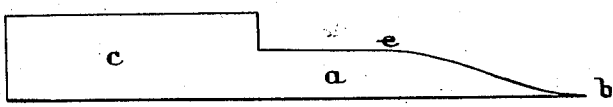

Figure 1 represents a perspective view; Fig. 2, a cross-section, and Fig. 3 a longitudinal elevation.

The form in which I make this corer is as follows: $a$ is the blade, being a partially-cylindrical knife with two cutting-edges, $e$ $e$, tapering by a gentle curve to a point, $b$. It may be formed from a cylinder, $c$, of metal, by cutting the same half through in the middle, and then splitting it thence in one direction longitudinally, and finally paring the corners at the extremity down to a point, $b$.

The operation of this implement is as follows: The point is inserted near the stem of the apple with its hollow part toward said stem, and forced into the core with a rotary motion; then the blade is pulled out, the apple reversed, and the same process repeated at the blossom end of the apple. The core can now be pulled out by means of the stem, or pushed out with the finger.

The apple-coring is thus effected speedily, effectively, and well, and the plan is particularly excellent for apples designed to be baked, as these, when so cored, will bake in half the time consumed in baking an uncored apple.

What I claim as my invention is—

The apple-corer $a$, of one piece of tubular imperforate metal, tapering, pen-like, to a single point, $b$, as constructed.

In testimony that I claim the foregoing apple-corer I have hereunto set my hand this 27th day of June, 1877.

EMMA E. ORENDORFF.

Witnesses:
 ANNIE B. ORENDORFF,
 J. C. APPLETON.